United States Patent [19]

Kohama et al.

[11] 4,409,828
[45] Oct. 18, 1983

[54] GAS FLOW MEASURING DEVICE

[75] Inventors: Tokio Kohama, Nishio; Hideki Obayashi, Okazaki; Hisasi Kawai, Toyohashi; Tsuneyuki Egami, Aichi, all of Japan

[73] Assignee: Nippon Soken, Inc., Nishio, Japan

[21] Appl. No.: 252,005

[22] Filed: Apr. 7, 1981

[30] Foreign Application Priority Data

Apr. 11, 1980 [JP] Japan ................................ 55-48191

[51] Int. Cl.³ .............................................. G01F 1/68
[52] U.S. Cl. ......................................... 73/204; 73/118
[58] Field of Search ................................. 73/118, 204

[56] References Cited

U.S. PATENT DOCUMENTS 3,800,592 4/1974 Jones, Jr. ............................. 73/204
3,975,951 8/1976 Kohama et al. ..................... 73/204

*Primary Examiner*—Herbert Goldstein
*Attorney, Agent, or Firm*—Cushman, Darby & Cushman

[57] ABSTRACT

An electric heater connected between first and second temperature dependent resistors provided inside a pipe through which the gas the flow of which is to be measured is heated for the measurement of the gas flow. A voltage control circuit controls the voltage applied to or current through the electric heater such as to maintain a constant potential difference between diagonal points of a bridge circuit which is formed by the first and second temperature dependent resistors and first and second reference resistors. An output computing circuit which receives a signal proportional to the voltage across the electric heater and also to the current therethrough produces an output signal representing the rate of flow of gas being measured.

5 Claims, 6 Drawing Figures

FIG. I
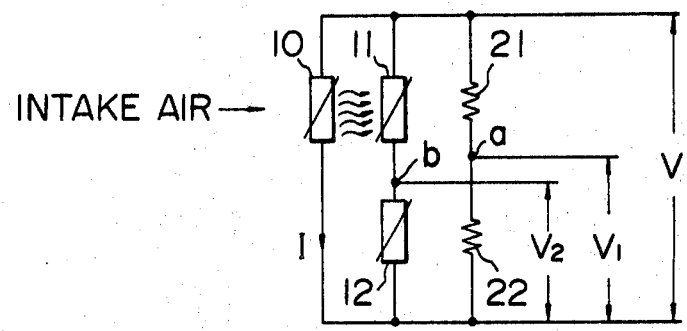
FIG. 2
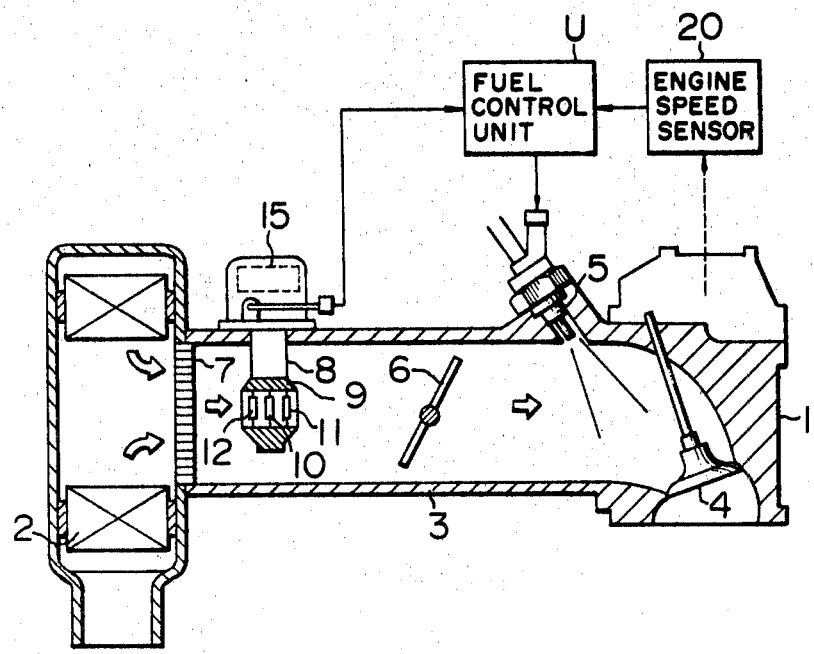

GAS FLOW MEASURING DEVICE

BACKGROUND OF THE INVENTION

This invention is related to copending U.S. application Ser. No. 092,024 filed on Nov. 7, 1979 and assigned to the same assignee.

This invention relates to gas flow measuring devices, and more particularly to devices for measuring, for instance, the intake air flow to an engine.

A device, which comprises an electric heater provided on an engine intake pipe and temperature dependent resistors provided upstream and downstream of the heater for detecting the flow rate of the intake air (which is to be measured), has been proposed.

This device is small in size and simple in construction, and it can measure heavy flow. However, since the electric heater and temperature dependent resistors are resistors having the same temperature coefficient, it is impossible to obtain the intake air flow rate that is completely compensated for the influence of the intake air temperature.

FIG. 1 shows an electric circuit which is given for explaining the principles of the gas flow measurement. Referring to FIG. 1, designated at 10 is an electric heater having a resistance $R_H$ ($\Omega$), at 11 a first temperature dependent resistor with a resistance $R_1$ ($\Omega$), at 12 a second temperature dependent resistor with resistance $R_2$ ($\Omega$), and at 21 and 22 reference resistors with resistances $R_3$ and $R_4$ ($\Omega$) which form a bridge circuit together with the first and second temperature dependent resistors. The electric heater 10 and first and second temperature dependent resistors 11 and 12 are constituted by resistors having the same temperature coefficient $\alpha$. When the intake air which is at a temperature $T_a$ (°C.) is heated by the electric heater so that its temperature is increased by $\Delta T$ (°C.), the temperatures of the first and second temperature dependent resistors are respectively ($T_a + \Delta T$) and $T_a$. At this time, the resistances $R_H$, $R_1$ and $R_2$ are respectively given as $$R_H = R_{OH}(1 + \alpha T_a + \alpha T_H) \quad (1)$$

$$R_1 = R_{01}(1 + \alpha T_a + \alpha \Delta T) \quad (2)$$

$$R_2 = R_{02}(1 + \alpha T_a) \quad (3)$$

(where $R_{OH}$, $R_{01}$ and $R_{02}$ are the resistances values of $R_H$, $R_1$ and $R_2$ at 0° C., and $\Delta T_H$ is the temperature rise from the intake air temperature $T_a$ caused by the electric heater.) Denoting the potentials at diagonal points a and b of the bridge respectively by $V_1$ and $V_2$, the output voltage $\Delta V$ ($= V_1$ and $V_2$) of the bridge is expressed as $$\Delta V = V \cdot \left( \frac{R_4}{R_3 + R_4} - \frac{R_2}{R_1 + R_2} \right) \quad (4)$$

(where V is the voltage applied to the bridge and electric heater.) Setting $R_3 = R_4$, $R_{01} = R_{02}$, the temperature difference $\Delta T$ is, from equation (2) to (4), $$\Delta T = \frac{4 \cdot (1 + \alpha T_a) \cdot \Delta V}{\alpha \cdot (V - 2 \cdot \Delta V)} \quad (5)$$

Meanwhile, ignoring the heat conduction except for that by the air from the electric heater, the intake air flow G (g/sec.), temperature difference $\Delta T$ and applied voltage V are related to one another as $$G \cdot C_p \cdot \Delta T = K_1 \cdot I^2 \cdot R_H \quad (6)$$

(where $C_p$ is the specific heat of air under a constant pressure, $K_1$ is a constant, and I is the current through the electric heater.) By cancelling $\Delta T$ in equations (5) and (6) we have $$G = K_2 \cdot \frac{V - 2 \cdot \Delta V}{(1 + \alpha T_a) \cdot \Delta V} \cdot I^2 \cdot R_H \quad (7)$$

Since in the operation of this device $\Delta V << V$, and $\Delta V$ is controlled to a constant, equation (7) is reduced to $$G = K_3 \cdot \frac{R_H^2}{(1 + \alpha \cdot T_a)} \cdot I^3, \text{ (where } K_3 \text{ is a constant)} \quad (8)$$

$$G = K'_3 \cdot \frac{1}{(1 + \alpha \cdot T_a) \cdot R_H} \cdot V^3 \text{ (where } K'_3 \text{ is a constant)} \quad (9)$$

The intake air flow is thus a function of the cube of the current flowing through the electric heater or the cube of the voltage applied to the electric heater. However, since its factor includes a term of the intake air temperature $T_a$, the measurement of the intake air flow is effected by the intake air temperature. This is undesired for the precise measurement of the intake air measurement.

SUMMARY OF THE INVENTION

This invention is intended in the light of the above affairs, and it has for its object to provide a gas flow measuring device, which permits precise gas flow measurement free from the influence of the gas temperature.

BRIEF DESCRIPTION OF THE DRAWINGS

FIG. 1 is a circuit diagram showing an electric circuit for explaining the principles of the gas flow measurement.

FIG. 2 is a schematic diagram showing an embodiment of the invention.

DESCRIPTION OF THE PREFERRED EMBODIMENT

Figure 3:
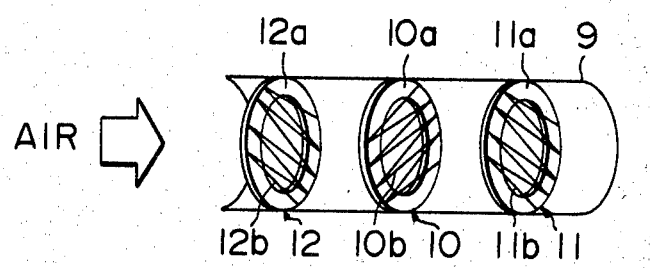
FIGS. 3 and 4 show, perspective and elevational view respectively, showing an electric heater and first and second temperature dependent resistors shown in FIG. 2.

Now, an embodiment of the invention will be described with reference to the accompanying drawings. Referring now to FIG. 2, designated at 1 is a spark ignition type engine for an automobile, into which air is withdrawn through an air cleaner 2, an intake pipe 3 and an intake valve 4. Fuel is injected from an electromagnetic fuel injection valve 5 provided on the intake pipe 3.

A throttle valve 6 which is operable by the driver is provided in the intake pipe 3, and a re-directing grid 7 for re-directing air is provided at the juncture between the air cleaner 2 and pipe 3. In the intake pipe 3, a small size flow measurement tube 9 is supported by a support 8 between the re-directing grid 7 and throttle valve 6 and extends substantially parallel to the axial direction of the pipe 3. As is pictorially shown in the Figure, an electric heater 10 constituted by a platinum resistor wire is provided inside the flow measurement tube 9. Also, a first temperature dependent resistor 11 which is also constituted by a platinum resistor wire is provided at a position downstream and in the vicinity of the electric heater 10, and second temperature dependent resistor 12 which is again constituted of a platinum resistor wire is provided at a position upstream and somewhat spaced apart from the electric heater 10.

Figure 4:
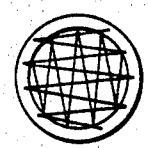

As shown in FIG. 3, the electric heater 10 and first and second temperature dependent resistors 11 and 12 respectively include ring-like printed members 10a, 11a and 12a and platinum resistor wires 10b, 11b and 12b set in the respective ring-like members. Particularly, platinum resistor wires having the same temperature coefficient are used for the first and second temperature dependent resistors 11 and 12. Also, the resistor wires of the electric heater 10 and first temperature dependent resistor 11 cross each other when viewed from the front (or rear) side as shown in FIG. 4 so that the first temperature dependent resistor 11 will not be affected by the influence of subtle temperature distribution in the flow measurement tube 9.

The electric heater 10 and first and second temperature dependent resistors 11 and 12 are all connected to a measurement circuit 15. The measurement circuit 15 determines the intake air flow rate from the output signals from the electric heater and first and second temperature dependent resistors and produces an electric signal corresponding to the flow rate.

Figure 5:
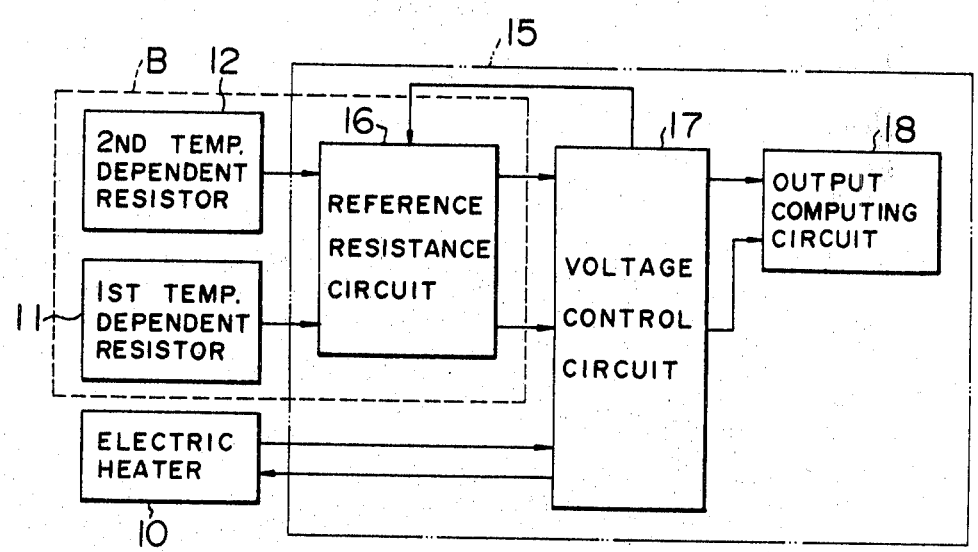
FIG. 5 is a block diagram of the measuring circuit shown in FIG. 2.

As shown in FIG. 5, the measurement circuit 15 includes a reference resistance circuit 16, a voltage control circuit 17 and an output computing circuit 18, and the reference resistance circuit 16 form a bridge B together with the first and second temperature dependent resistors 11 and 12. The voltage control circuit 17 controls the voltage applied to the bridge B and electric heater 10 according to the voltages at the diagonal points a and b of the bridge.

Referring back to FIG. 2, a fuel control unit U is provided for controlling the open period of the electromagnetic fuel injection valve 5 according to the signal from the measurement circuit 15. The unit U also receives the detection signal from an engine speed sensor 20 for detecting the rpm of the engine 1. For the engine speed sensor 20 may be utilized, for instance, an ignition circuit which produces an ignition pulse signal.

Figure 6:
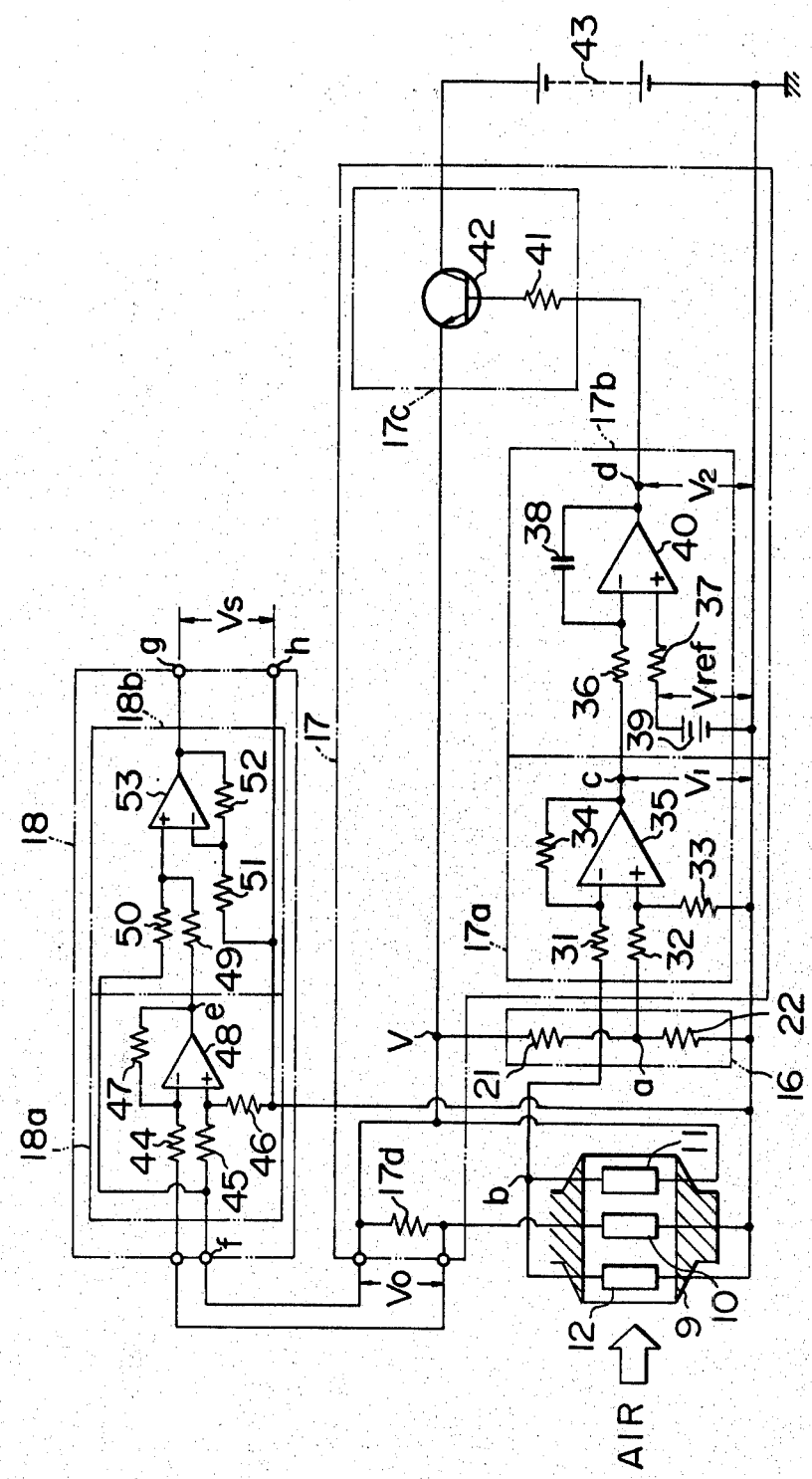
FIG. 6 is a circuit diagram of the measuring circuit shown in FIG. 5.

Now, the circuits 16, 17 and 18 in the measurement circuit 15 will be described with reference to FIG. 6. The reference resistance circuit 16 includes first and second reference resistors 21 and 22 which form the bridge B together with the first and second temperature dependent resistors 11 and 12.

The voltage control circuit 17 essentially includes a first differential amplifier 17a, a second differential amplifier 17b, a power amplifier circuit 17c and an output resistor 17d. The first differential amplifier 17a has input resistors 31 and 32 a grounding resistor 33, a negative feedback resistor 34 and an operational amplifier (hereinafter referred to as OP amplifier) 35, and differentially amplifies the outputs at the diagonal points a and b of the bridge B to produce an output from a terminal c.

The second differential amplifier 17b has input resistors 36 and 37, a capacitor 38, a reference voltage source 39 and an OP amplifier 40, and differentially amplifies the output voltage $V_1$ at the terminal c and a constant reference voltage $V_{ref}$ of the reference voltage source 39 to produce an output from a terminal d. The capacitor 38 is provided for preventing the oscillation of the device.

The power amplifier circuit 17c includes a resistor 41 and a power transistor 42, and the power transistor 42 is furnished with power from a power supply 43 and power amplifies the output voltage form the second amplifying circuit 17b to provide an output to the bridge B and electric heater 10.

The output resistor 17d provides a voltage that is related to the flow rate of the intake air to be measured, and is connected in series with the electric heater 10.

The output computing circuit 18 essentially includes a differential amplifier circuit 18a and an additive amplifier circuit 18b. The differential amplifier circuit 8a has input resistors 44 and 45, a grounding resistor 46, a negative feedback resistor 47 and an OP amplifier 48, and differentially amplifies the voltage $V_O$ across the output resistor 17d to provide an output from a terminal e.

The additive amplifier 18b has input resistors 49 and 50, a grounding resistor 51, a negative feedback resistor 52 and an OP amplifier 53, and additively amplifies the voltage at the terminal e and the voltage at the terminal f to provide an output from a terminal g.

The operation of the above construction will be described. A quantity of air which is determined by the aperture of the throttle valve 6 is withdrawn through the air cleaner 2 and intake pipe 3 into the engine 1. A certain proportion of the total intake air is withdrawn through the flow measurement tube 9 into the engine 1.

In the flow measurement tube 9, the second temperature dependent resistor 12 which is provided upstream the electric heater 10 is influenced only by the temperature of the intake air, while the first temperature dependent resistor 11 which is provided downstream the electric heater 10 is influenced by the temperature of the intake air and the quantity of heat generated by the electric heater 10, that is, it is influenced by the temperature of heat heated by the electric heater 10.

As a result, a temperature difference $\Delta T$ related to the power P (W) supplied to the electric heater 10 and the intake air flow G (g/sec.) is produced between the temperature dependent resistors 11 and 12. Here, P, G and $\Delta T$ are related as $$K_4 \cdot \Delta T = P/G \text{ (where } K_4 \text{ is a constant)} \tag{10}$$

The electric resistances of the temperature dependent resistors 11 and 12 vary in dependence upon the temperature of air flowing past them. The potential difference $\Delta V$ between the points a and b of the bridge is determined by the temperature difference $\Delta T$ and the voltage V applied to the bridge, and assuming $V \gg \Delta V$, from equation (5), $$\Delta V = \frac{\alpha}{4(1 + \alpha \cdot T_a)} \cdot \Delta T \cdot V \tag{11}$$

(where $T_a$ is the temperature of the intake air, and $\alpha$ is the temperature coefficient of the resistance of platinum.

Thus, from equations (10) and (11) we obtain a relation $$K_5 \cdot (1 + \alpha T_a) \cdot \Delta V/V = P/G \text{ (where } K_5 \text{ is a constant)} \tag{12}$$

By controlling the power P supplied to the electric heater 10 and voltage V applied to the bridge such as to make $\Delta V$ constant, we can obtain as the relationship among the intake air flow G, supply power P and the bridge application voltage V an equation $$G = K_6 \frac{P \cdot V}{(1 + \alpha T_a)} \text{ (where } K_6 \text{ is a constant)} \tag{13}$$

By setting the resistance of the output resistor 17d to be low compared to the resistance of the electric heater 10, we obtain $$P = R_{OH}(1 + \alpha_H \cdot T_H) \cdot I^2 \tag{14}$$

$$V = R_{OH}(1 + \alpha_H \cdot T_H) \cdot I \tag{15}$$

where $\alpha_H$ is the temperature coefficient of the resistance of the electric heater 10, and I is the current through the heater, and equation (13) can be re-written as $$G = K_7 \cdot \frac{(1 + \alpha_H \cdot T_H)^2}{(1 + \alpha T_a)} \cdot I^3 \text{ (where } K_7 \text{ is a constant)} \tag{16}$$

$$G = K_7 \cdot \frac{1}{(1 + \alpha T_a)(1 + \alpha_H \cdot T_H)} \cdot V^3 \tag{17}$$

Here, the intake air flow G is a function of the cube of the current I (or voltage V). Since the factor of the right side of equation (16) (or (17)) includes the term $T_a$ which represents the temperature of the intake air, the measurement based upon either of these equations is effected by the intake air temperature. If it is assumed that all the power supplied to the electric heater is transmitted to the intake air, the heater temperature $T_H$ in equations (16) and (17) is $T_H = T_a$, and by setting the temperature coefficients of the resistances of the electric heater and temperature dependent resistors equal, i.e., setting $\alpha_H = \alpha'$, we obtain $$G = K_8 \cdot (1 + \alpha \cdot T_a) \cdot I^3 \text{ (where } K_8 \text{ is a constant)} \tag{18}$$

$$G = K_8 \cdot \frac{1}{(1 + \alpha T_a)^2} \cdot V^3 \tag{19}$$

Solving equations (18) and (19) for I and V $$I = K_9 \cdot \sqrt[3]{\frac{1}{(1 + \alpha \cdot T_a)} \cdot G} \text{ (where } K_9 \text{ is a constant)} \tag{20}$$

$$V = K_9 \cdot \sqrt[3]{(1 + \alpha T_a)^2 \cdot G} \tag{21}$$

Equations (20) and (21) can be approximated as $$I \approx K_{10} \frac{1}{\left(1 + \frac{\alpha}{3} T_a\right)} \sqrt[3]{G} \text{ (where } K_{10} \text{ is a constant)} \tag{22}$$

$$V \approx K_{10}(1 + \tfrac{2}{3}\alpha T_a) \sqrt[3]{G} \tag{23}$$

If the output voltage $V_s$ of the output computing circuit 18 is defined as $$V_s = \frac{K'_{10}}{l + m} \cdot (mI + lV) \text{(where } K'_{10}, l \text{ and } m \text{ are constants)} \tag{24}$$

from equations (22), (23) and (24)

$$V_s \approx K'_{10} \times K_{10} \times \frac{1 + \frac{\alpha}{1 + m/l} T_a}{1 + \frac{\alpha}{3} T_a} \times \sqrt[3]{G} \tag{25}$$

By selecting $m/l = 2$, equations (25) is reduced to $$V_s \approx K_{11} \sqrt[3]{G} \text{ (where } K_{11} \text{ is a constant)} \tag{26}$$

that is, $$G \approx K_{11} \cdot V_s^3 \tag{27}$$

In this case, the cube of the voltage $V_s$ is proportional to the intake air flow alone and free from the influence of the intake air temperature.

In connection with equation (24), the signals input to the output computing circuit 18 are voltages V and $(V - V_o)$.

Here, as Vo is obtained by detecting a current flowing through the electric heater, the following relation is formed:

$$V_o = R_{17}d \times I \tag{28}$$

where $R_{17}d$ denotes resistance of the output resistor.

The difference between the two input voltages V and $(V - V_o)$ is outputted by the differential amplifier circuit 18a. When the gain of the differential amplifier circuit 18a is A, the output voltage Ve at the terminal e in FIG. 6 can be expressed by the following equation:

$$\begin{aligned} V_e &= A \times \{V - (V - V_o)\} \\ &= A \times V_o \\ &= A \times R_{17}d \times I \end{aligned} \tag{29}$$

If the resistors 49 to 52 have the same constant, the differential amplifier circuit 18a can be formed by a non-inversion adder circuit. As the added voltages are Ve and V, the output voltage $V_s$ can be expressed by the following equation:

$$V_s = A' \times (V_e + V) \tag{30}$$

where A' denotes the gain of an amplifier 53. Accordingly, $$V_s A' \times (A \times R_{17}d \times I + V) \tag{31}$$

By comparing equations (24) and (31), it can be seen that they are identical if:

$$A' \text{ corresponds to } \frac{K'_{10}}{l + m},$$

$A \times R_{17}d$ corresponds to m, and $l = 1$.

The introduction of the approximations (22) and (23) mentioned above practically has no effect upon the actual measurement.

The voltage control circuit 16 controls $\Delta V$ to be constant through the control of the heat generation in the electric heater 10. With increase of the intake air flow the temperature of air heated by the electric heater 10 is reduced, whereby the temperature difference $\Delta T$ between the first second temperature dependent resistors 11 and 12 is reduced to reduce the potential difference $\Delta V$ between the points a and b of the bridge.

As a result, the output voltage $V_1$ of the first differential amplifier circuit 17a is reduced to increase the output voltage $V_2$ of the second differential amplifier circuit 7b, provides a voltage corresponding to $V_{ref}-V_1$). With the increase of the output voltage $V_2$ the current supplied from the power amplifier circuit 17c to the electric heater 10 is increased to increase the heat generation in the electric heater 10.

Consequently, the temperature difference $\Delta T$ between the first and second temperature dependent resistors 11 and 12 is increased to increase the potential difference $\Delta V$ between the points a and b of the bridge. When the potential difference $\Delta V$ becomes equal to the reference voltage $V_{ref}$, the system as a whole is balanced and stabilized although the bridge is in an unbalanced state.

With the decrease of the intake air flow, the temperature of air heated by the electric heater 10 is increased, whereby the temperature difference $\Delta T$ between the first and second temperature dependent resistors 11 and 12 is increased to increase the potential difference $\Delta V$.

As a result, the output voltage $V_1$ of the first differential amplifier circuit 17a is increased to reduce the output voltage $V_2$ of the second differential amplifier circuit 17b. With the reduction of the voltage $V_2$ the current supplied from the power amplifier circuit 17c to the electric heater 10 is increased to reduce the heat generation in the electric heater 10.

Thus, the temperature difference $\Delta T$ is reduced to reduce the potential difference $\Delta V$ to be equal to the reference voltage $V_{ref}$, whereby both the system and bridge are stabilized.

In the above way, the potential difference $\Delta T$ between the points a and b of the bridge is always held at the constant level $V_{ref}$ irrespective of the intake air flow. Thus, equations (18) and (19) are satisfied, and the intake air flow G is represented by the function of the cube of the current I through or voltage V applied to the electric heater 10.

Since the current I also flows through the output resistor 17d, it is proportional to the terminal voltage $V_O$ across the output resistor 17d, and the cube of the voltage $V_O$ is proportional to the intake air flow G.

This voltage $V_O$ proportional to the voltage V and also to current I is coupled to the output computing circuit 18 and amplified in the differential amplifier circuit 18a. The amplified signal and voltage V are additively amplified in the additive amplifier circuit 18b in such a manner as to meet m/l=2 in equation (25), and the voltage $V_s$ appearing between the output terminal g and earth terminal h satisfies equation (27) and represents the sole intake air flow.

The voltage $V_s$ is coupled as a signal representing the intake air flow G to the fuel control unit U, and according to this signal and also to the output signal from the engine speed sensor 20 an injection pulse signal for opening the fuel injection valve 5 is produced from the fuel control unit U. Thus, air and fuel is supplied in the accurate air-to-fuel ration A/F to the engine 1, and thus the exhaust gas purification, output characteristics and fuel consumption of the engine 1 can be improved.

While in the above embodiment resistor wires have been employed as the electric heater and first and second temperature dependent resistors, it is also possible to make use of film resistors and resistors fabricated by other processes inasmuch as the temperature coefficient of their resistance is utilized. Further, while the above embodiment has concerned with a fuel injection type engine, the invention is also applicable for us in case where the exhaust gas re-circulation rate or ignition timing advance angle in an engine with a carburetor is controlled according to the intake air flow. The invention is further applicable not only to the engine but also to the measurement of the gas flow in other fuel supply mechanisms.

Furthermore, the invention is suited for use in the gas flow measurement not only in the engine but also in other industrial measurement fields.

Moreover, it is possible to provide a linear output signal representing the intake air flow by using an analog linearization circuit of ROM (Read Only Memory) for the measurement circuit 15.

We claim:

1. A gas flow measuring device comprising:
   pipe means for flowing a gas whose flow rate is to be measured;
   an electric heater disposed within said pipe means;
   a first temperature dependent resistor disposed within said pipe means downstream of said electric heater;
   a second temperature dependent resistor disposed within said pipe means, at a position suffering substantially no influence of heat from said electric heater; and
   a measuring circuit connected to said first and second temperature dependent resistors and to said electric heater to generate an output voltage indicative of the flow rate of the gas depending on the resistance values of said first and second temperature dependent resistors;
   said measuring circuit including a first reference resistor and a second reference resistor constituting a bridge circuit together with said first and second temperature dependent resistors; a voltage control circuit connected to said bridge circuit and said electric heater, for controlling a heater voltage applied to said electric heater so as to maintain a voltage difference between opposite terminals of said bridge circuit at a constant value; and output computing means, connected to said voltage control circuit, responsive to said heater voltage and a heater current flowing through said electric heater, for generating said output voltage by summing a first value proportional to said heater voltage and a second value proportional to said heater current, to substantially eliminate the effects of ambient temperature on said output voltage.

2. A gas flow measuring device according to claim 1, wherein said pipe means includes:
   a flow rate measuring pipe disposed within an intake air pipe of an engine; and
   means for supporting said flow rate measuring pipe.

3. A gas flow measuring device according to claim 1 or 2, wherein said voltage control circuit includes an output resistor connected in series with said electric heater, and wherein said output computing means includes a summing amplifier circuit, both a voltage at an end of said output resistor remote from said electric heater and a voltage across said output resistor being inputted to said summing amplifier circuit through respective resistors.

4. A gas flow measuring device according to claim 3, wherein said output computing means further includes a differential amplifier circuit connected between said output resistor and said summing amplifier circuit, for amplifying the voltage across said output resistor.

5. A gas flow measuring device according to claim 1 or 2, wherein the magnitude of said second value is twice that of said first value.

* * * * *